United States Patent
Lotlikar et al.

(10) Patent No.: US 8,539,020 B2
(45) Date of Patent: Sep. 17, 2013

(54) SESSIONS TO HOST PROCESSES WITH SPECIAL REQUIREMENTS

(75) Inventors: Mahesh Lotlikar, Sammamish, WA (US); Sriram Sampath, Redmond, WA (US); Ara Bernardi, Mercer Island, WA (US); Costin Hagiu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 456 days.

(21) Appl. No.: 12/815,073

(22) Filed: Jun. 14, 2010

(65) Prior Publication Data

US 2011/0307544 A1 Dec. 15, 2011

(51) Int. Cl.
*G06F 15/16* (2006.01)
*G06F 15/173* (2006.01)

(52) U.S. Cl.
USPC ............ 709/203; 709/226; 709/208; 709/202

(58) Field of Classification Search
USPC ........................................................ 709/203
See application file for complete search history.

(56) References Cited

U.S. PATENT DOCUMENTS

| | | | |
|---|---|---|---|
| 5,276,879 A | 1/1994 | Barry et al. | |
| 7,180,475 B2* | 2/2007 | Slobodin et al. | 345/2.3 |
| 7,529,823 B2 | 5/2009 | Trufinescu et al. | |
| 7,600,024 B2 | 10/2009 | Jodh et al. | |
| 7,905,604 B2* | 3/2011 | Slobodin et al. | 353/30 |
| 2002/0116549 A1 | 8/2002 | Raffaele et al. | |
| 2004/0148375 A1* | 7/2004 | Levett et al. | 709/223 |
| 2006/0059335 A1* | 3/2006 | Bernardi et al. | 713/164 |
| 2006/0059529 A1* | 3/2006 | Bernardi et al. | 725/132 |
| 2006/0215832 A1 | 9/2006 | Schwerk | |
| 2007/0044028 A1* | 2/2007 | Dunn et al. | 715/761 |
| 2008/0046974 A1 | 2/2008 | Minodier et al. | |
| 2009/0100003 A1 | 4/2009 | Lahtinen | |
| 2010/0042992 A1 | 2/2010 | Vasilevsky et al. | |
| 2010/0049783 A1* | 2/2010 | Ryman | 709/202 |
| 2010/0049797 A1* | 2/2010 | Ryman | 709/203 |
| 2010/0050077 A1* | 2/2010 | Ryman | 715/704 |

OTHER PUBLICATIONS

Microsoft, "Impact of Session 0 Isolation on Services and Drivers in Windows Vista" dated Mar. 17, 2006 {supplied by Applicant}, 7 pages.*
Microsoft, "Windows HPC Server 2008" dated Nov. 2008 {supplied by Applicant}, 10 pages.*
"Impact of Session 0 Isolation on Services and Drivers in Windows Vista", Microsoft Windows Vista, Mar. 17, 2006, 1-7.
"Windows HPC server 2008", Microsoft, Nov. 2008, 1-10.
Alex, "Inside Session 0 Isolation and the UI Detection Service—Part 2", www.alex-ionescu.com-?p=60, Alex Ionescu's Blog, accessed Apr. 13, 2010, 5 pages.
Shields, "Remote Desktop Virtualization: Windows R2's most compelling feature", Virtual Desktop Management Tips, www.searchvirtualdesktop.techtarget.com-tip-0,289483,sid194_gci1364392,00.html, accessed Apr. 13, 2010, 3 pages.

* cited by examiner

*Primary Examiner* — Richard G Keehn

(74) *Attorney, Agent, or Firm* — Woodcock Washburn, LLP

(57) ABSTRACT

Techniques are disclosed for enabling a system service executing in an isolated session to access system resources (such as a graphics processing unit) that it is isolated from. In an embodiment, the system service creates a "worker" session that is not isolated, and a "worker" process inside that worker session. Then, the system service is able to access the system resource that it is directly isolated from accessing by passing a request to the worker process to access the system resource on the system service's behalf. The worker process does so, and passes a result to the system service.

19 Claims, 9 Drawing Sheets

SESSIONS TO HOST PROCESSES WITH SPECIAL REQUIREMENTS

BACKGROUND

Computers interact with a wide variety of other computers through Local Area Networks (LANs), Wide Area Networks (WANs), dial-up connections, and the like. With the widespread growth of the Internet, connectivity between computers has become more important and has opened up many new applications and technologies. The growth of large-scale networks, and the wide-spread availability of low-cost personal computers, has fundamentally changed the way that many people work, interact, communicate, and play.

An increasingly important form of networking may generally be referred to as remote presentation, which can use protocols such as Remote Desktop Protocol (RDP), Independent Computing Architecture (ICA), and others similar protocols to share a desktop and other applications with a remote client. Such computing systems typically transmit the keyboard presses and mouse clicks or selections from the client to a server and relay the screen updates back in the other direction over a network connection (e.g., the Internet). As such, the user experience is a local computing environment with centralized server control over the processing and applications.

Some systems that serve remote presentation sessions do so through the use of one or more services (such as a process that runs regardless of whether a user session is active). Such a service may receive image data from a client or user session on the system that is serving a remote presentation session to a client, encode it and transmit it to the client via a remote presentation session protocol.

Difficulties arise where this remote presentation session service executes in a "session" (each user logged into the operating system is given a separate session, or memory and execution space, in which to execute his processes) that does not have access to system resources that the service needs to effectuate its purpose. Some operating systems, like MICROSOFT WINDOWS 7, separate the services of the operating system into their own session (in the MICROSOFT WINDOWS 7 operating system, this session is known as "session 0," and herein such a session that contains services separated into its own session will be referred to as such). Session 0 is frequently isolated and is subject to security constraints—for instance, session 0 may not be able to access a graphics processing unit (GPU) of the computer on which it executes. Lack of access to a GPU prevents a service from leveraging the power of the GPU to perform complex graphics operations, like compression and rendering.

Furthermore, there may be a problem with using a standard user session to enable session 0 to utilize the GPU. For instance, a standard user session is an interactive session, where the user may be logged off, and if that user initiates log off, all processes in that session will terminate, including any processes used to enable session 0 to utilize the GPU. Furthermore, even if these processes used to enable session 0 to utilize the GPU are recreated when they terminate, there is still the issue of time lost to this recreation process, which negatively impacts user experience.

Thus, this isolation of session 0 poses a problem for services that attempt to utilize the GPU, such as a remote presentation session service that attempts to utilize the GPU to compress an image rapidly, or while minimizing CPU resources consumed in performing this compression.

SUMMARY

A remote presentation session server that serves remote presentation sessions in virtual machines (VMs) enables a service executing in an isolated session 0 to access a GPU of the computer upon which the service executes. Consequently, a client logs into a VM of the server for a remote presentation session and to serve that session a broker service creates a process responsible for rendering graphics in the VM host partition that instantiates a graphics stack for the VM (and any other VM that hosts a remote presentation session). The broker service hosts the process in a session that persists until the server shuts down or restarts to keep the process running and provide uninterrupted service to the client. This session is referred to as the "worker session."

Preferably, a special-purpose session that is independent of a user session (insomuch as the user account for the special-purpose session is managed by the service that invokes it, and does not belong to an actual user of the system) is created. The worker session hosts processes that have access to a computer's video card and GPU. A service executing in session 0 may then create a process in the worker session (this process is herein referred to as a "worker process"). The service will communicate a command to be executed by the GPU to the worker process, which will have the GPU perform the command, and then return the result to the service.

According to an aspect of the invention, a remote desktop virtualization server hosts a plurality of virtual machines (VMs) that client computers can connect to and conduct remote presentation sessions with. Each client connected to the server has a corresponding remote presentation session process that executes within the client's session space. These remote presentation session processes make calls to a remote presentation session service executing in session 0 to perform tasks such as encode and transmit an image of the desktop of the client session associated with the remote presentation session process. The remote presentation session service creates a worker session, and a worker process within that worker session. That worker process has access to the GPU of the server. When the remote presentation session service has received an indication from a remote presentation session process to perform a task that involves use of the GPU, the remote presentation session service requests that the worker process contact the GPU to perform the GPU operations. The worker process does so, receives from the GPU a result of the GPU processing those GPU operations, and passes that result back to the remote presentation session. The remote presentation session then uses that result to transmit to the client remote presentation session data.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer-readable media for sessions as a container to host processes with special requirements are further described with reference to the accompanying drawings in which.

DETAILED DESCRIPTION OF ILLUSTRATIVE EMBODIMENTS

Figure 1:
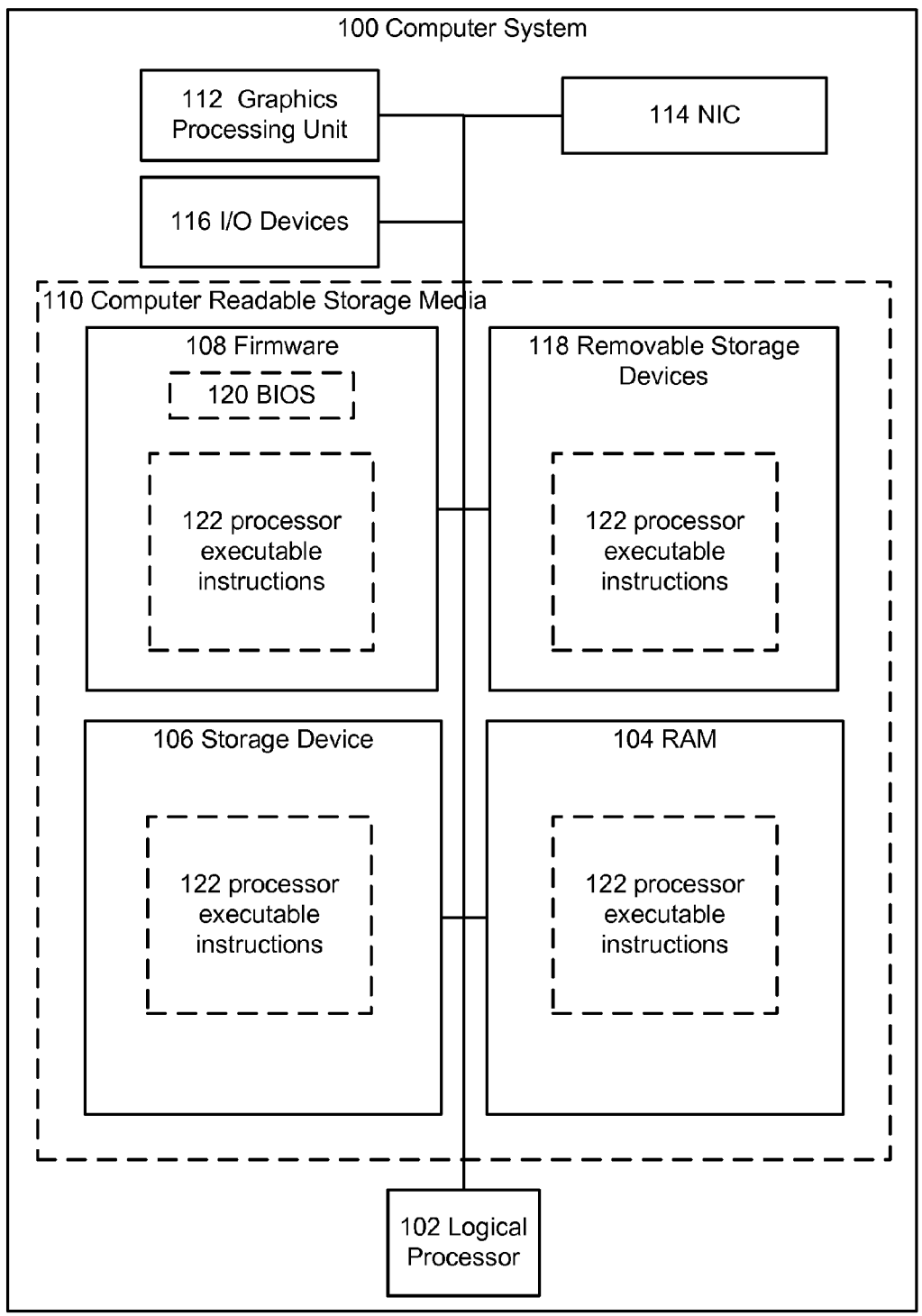
FIG. 1 illustrates an exemplary general purpose computing environment in which in which the techniques described herein may be embodied.

FIG. 1 is a block diagram of a general purpose computing device in which the techniques described herein may be employed. FIG. 1 and the following discussion are intended to provide a brief general description of a suitable computing environment in which the disclosure may be implemented.

The term circuitry used throughout the disclosure can include hardware components such as hardware interrupt controllers, hard drives, network adaptors, graphics processors, hardware based video/audio codecs, and the firmware used to operate such hardware. The term circuitry can also include microprocessors, application specific integrated circuits, and/or one or more logical processors, e.g., one or more cores of a multi-core general processing unit configured by firmware and/or software. Logical processor(s) can be configured by instructions embodying logic operable to perform function(s) that are loaded from memory, e.g., RAM (herein referred to as "system memory"), ROM, firmware, and/or mass storage. In an example embodiment where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, and Bernoulli cartridges.

The computer readable storage media 110 can provide non volatile and volatile storage of processor executable instructions 122, data structures, program modules and other data for the computer 100 such executable instructions that effectuate manager 250 described in the following figures. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processing unit (GPU) 112 having access to video memory. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card (NIC) 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. More-over, while it is envisioned that numerous embodiments of the present disclosure are particularly well-suited for computerized systems, nothing in this document is intended to limit the disclosure to such embodiments.

Figure 2:
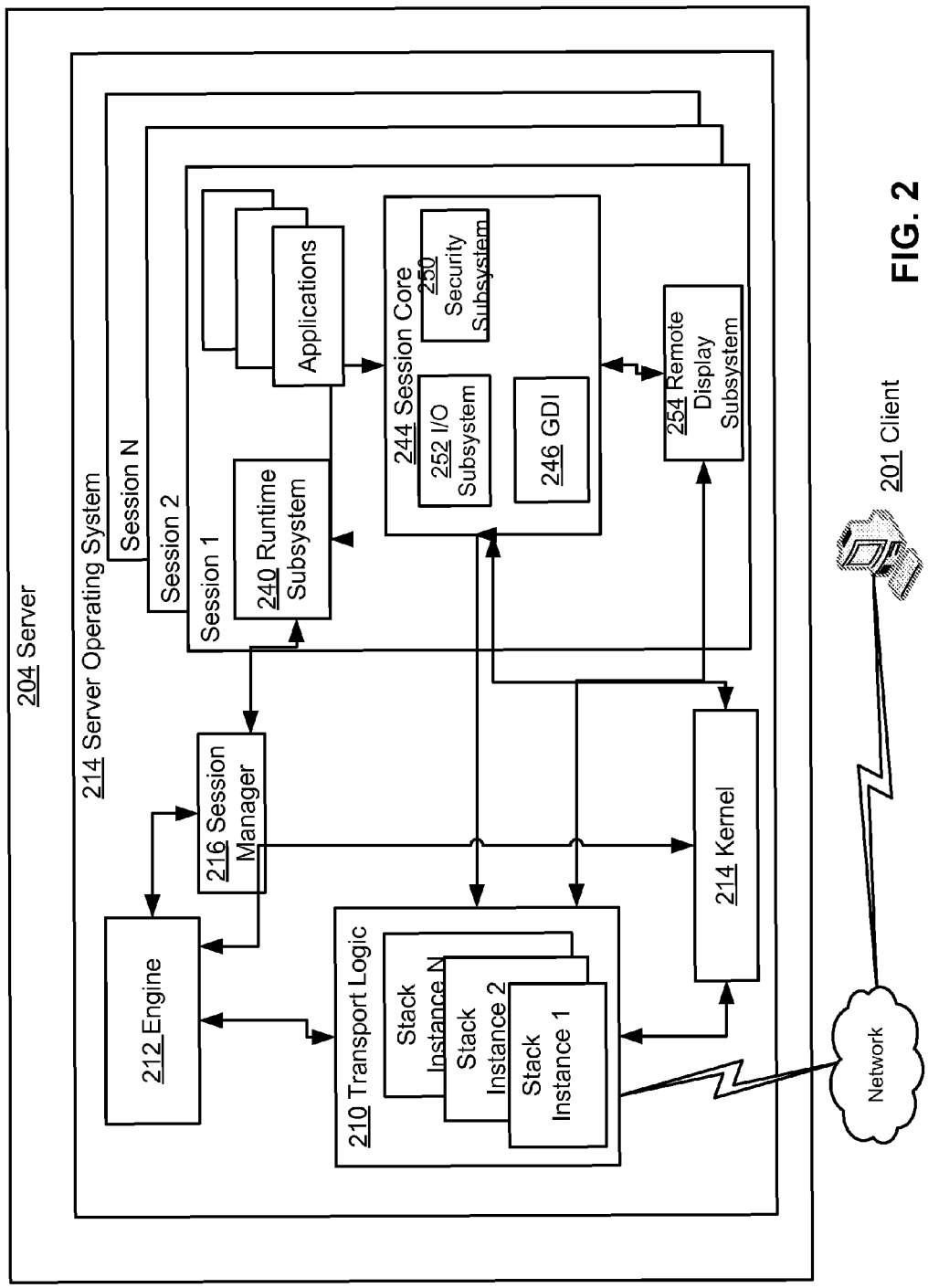
FIG. 2 depicts an example remote presentation session server wherein aspects of the present disclosure can be implemented.

Referring now to FIG. 2, it generally illustrates an example environment wherein aspects of the present disclosure can be implemented. One skilled in the art can appreciate that the example elements depicted by FIG. 2 are illustrated to provide an operational framework for describing the present disclosure. Accordingly, in some embodiments the physical layout of each environment may be different depending on different implementation schemes. Thus the example operational framework is to be treated as illustrative only and in no way limit the scope of the claims. One skilled in the art can also appreciate that the following discussion is introductory and the elements depicted by FIG. 2 are described in more detail within the discussion of the operational procedures depicted by FIG. 3.

Generally, FIG. 2 depicts a high level overview of a server environment that can be configured to include aspects of the present disclosure. In reference to the figure, depicted is a server 204 that can include circuitry configured to effectuate a remote presentation session server, or in other embodiments the server 204 can include circuitry configured to support remote desktop connections. In the depicted example, the server 204 can be configured to generate one or more sessions for connecting clients such as sessions 1 through N (where N is an integer greater than 2). Briefly, a session in example embodiments of the present disclosure can generally include an operational environment that is effectuated by a plurality of subsystems, e.g., software code, that are configured to interact with a kernel 214 of server 204. For example, a session can include a process that instantiates a user interface such as a desktop window, the subsystems that track mouse movement within the window, the subsystems that translate a mouse click on an icon into commands that effectuate an instance of a program, etc. A session can be generated by the server 204 on a user by user basis by the server 204 when, for example, the server 204 receives a connection request over a network connection from a client 201. Generally, a connection request can first be handled by the transport logic 210 that can, for example, be effectuated by circuitry of the server 204. The transport logic 210 can in some embodiments include a network adaptor; firmware, and software that can be configured to receive connection messages and forward them to the engine 212. As illustrated by FIG. 2, the transport logic 210 can in some embodiments include protocol stack instances for each session. Generally, each protocol stack instance can be configured to route user interface output to a client and route user input received from the client to the session core 244 associated with its session.

Continuing with the general description of FIG. 2, the engine 212 in some example embodiments of the present disclosure can be configured to process requests for sessions; determine the functionality for each session; generate sessions by allocating a set of physical resources for the session; and instantiating a protocol stack instance for the session. In some embodiments the engine 212 can be effectuated by specialized circuitry components that can implement some of the above mentioned operational procedures. For example, the circuitry in some example embodiments can include memory and a processor that is configured to execute code that effectuates the engine 212. As depicted by FIG. 2, in some instances the engine 212 can receive connection requests and determine that, for example, a license is available and a session can be generated for the request. In the situation where the server 204 is a remote computer that includes remote desktop capabilities, the engine 212 can be configured to generate a session in response to a connection request without checking for a license. As illustrated by FIG. 2, a session manager 216 can be configured to receive a message from an engine 212 and in response to the message the session manager 216 can add a session identifier to a table; assign memory to the session identifier; and generate system environment variables and instances of subsystem processes in memory assigned to the session identifier.

As illustrated by FIG. 2, the session manager 216 can instantiate environment subsystems such as a runtime subsystem 240 that can include a kernel mode part such as the session core 244. For example, the environment subsystems in an embodiment are configured to expose some subset of services to application programs and provide an access point to the kernel of the operating system 214. In example embodiments the runtime subsystem 240 can control the execution of processes and threads and the session core 244 can send requests to the executive of the kernel 214 to allocate memory for the threads and schedule time for them to be executed. In an embodiment the session core 244 can include a graphics display interface 246 (GDI), a security subsystem 250, and an input subsystem 252. The input subsystem 252 can in these embodiments be configured to receive user input from a client 201 via the protocol stack instance associated with the session and transmit the input to the session core 244 for the appropriate session. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or a desktop and be processed by the GDI 246. The GDI 246 in general can include a process that can generate graphical object draw commands. The GDI 246 in this example embodiment can be configured to pass its output to the remote display subsystem 254 where the commands are formatted for the display driver that is attached to the session. In certain example embodiments one or more physical displays can be attached to the server 204, e.g., in a remote desktop situation. In these example embodiments the remote display subsystem 254 can be configured to mirror the draw commands that are rendered by the display driver(s) of the remote computer system and transmit the mirrored information to the client 201 via a stack instance associated with the session. In another example embodiment, where the server 204 is a remote presentation session server, the remote display subsystem 254 can be configured to include virtual display driver(s) that may not be associated with displays physically attacked to the server 204, e.g., the server 204 could be running headless. The remote display subsystem 254 in this embodiment can be configured to receive draw commands for one or more virtual displays and transmit them to the client 201 via a stack instance associated with the session. In an embodiment of the present disclosure, the remote display subsystem 254 can be configured to determine the display resolution for each display driver, e.g., determine the display resolution of the virtual display driver(s) associated with virtual displays or the display resolution of the display drivers associated with physical displays; and route the packets to the client 201 via the associated protocol stack instance.

In some example embodiments the session manager 216 can additionally instantiate an instance of a logon process associated with the session identifier of the session that can be configured to handle logon and logoff for the session. In these example embodiments drawing commands indicative of the graphical user interface associated with the logon process can be transmitted to the client 201 where a user of the client 201 can input an account identifier, e.g., a username/password combination, a smart card identifier, and/or biometric information into a logon screen. The information can be transmitted to server 204 and routed to the engine 212 and the security subsystem 250 of the session core 244. For example, in certain example embodiments the engine 212 can be configured to determine whether the user account is associated with a license; and the security subsystem 250 can be configured to generate a security token for the session.

The primary embodiment described in FIGS. 3-9 is of a MICROSOFT WINDOWS® operating system architecture. It may be appreciated there are many versions of the MICROSOFT WINDOWS® operating system, and not all versions contain all the characteristics described herein. However, the use of a MICROSOFT WINDOWS® operating system as the primary embodiment discussed has the advantage aiding in clarity by making reference to components and a system architecture that many are generally familiar with. It may be appreciated that the techniques described herein may be applied in operating systems that have user sessions, and where services execute in an isolated session.

Figure 3:
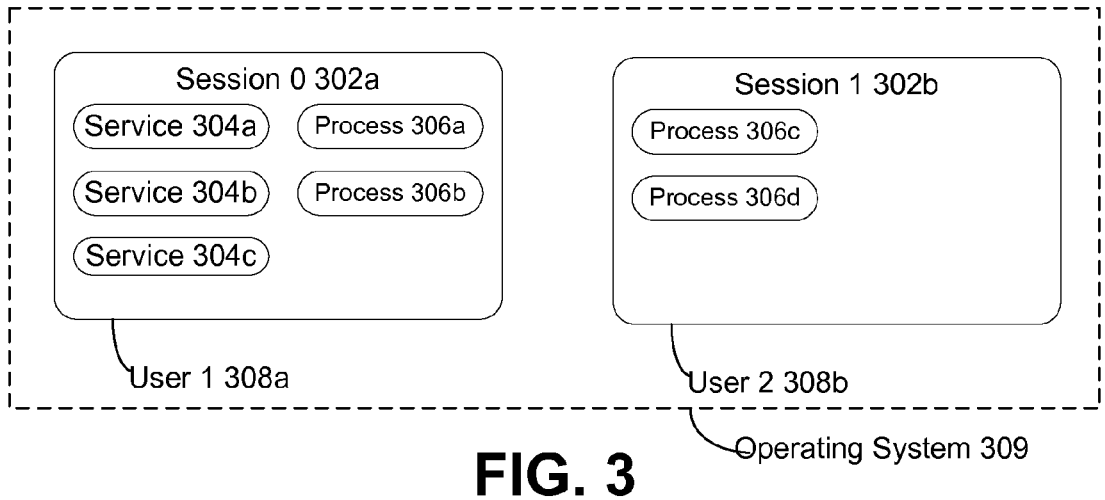
FIG. 3 depicts two user sessions executing on a computer wherein both services and user processes execute within a single session.

FIG. 3 depicts two user sessions executing on a computer wherein both services and user processes execute within a single session. Session 0 302a and session 1 302b are instantiated within operating system 309 a computing device, such as computer system 100 of FIG. 1. Where the computing device is computer system 100, operating system 309 may comprise an operating system comprising instructions stored in firmware 108, storage device 106, RAM 104, and/or removable storage devices 118 of FIG. 1. Services 304a-c execute within session 0 302a. Session 0 302a is also associated with user 1 308b. User 1 308a may be assigned to session 0 upon logging in because user 1 308a is the first user to log in since the computer most recently booted up. Processes 306a-b of user 1 308a also execute within session 0 302. This means that both services and a user's processes execute within a single session, so services are not isolated within their own session. If user 1 308a logs out, it may be that there are no user processes executing within session 0 302a, only services 304a-c. Each successive user that logs in may be given an incremented session, such that user 2 308b is assigned to session 1 302b. Processes 306c-d of user 308b execute within session 1 308b.

Figure 4:
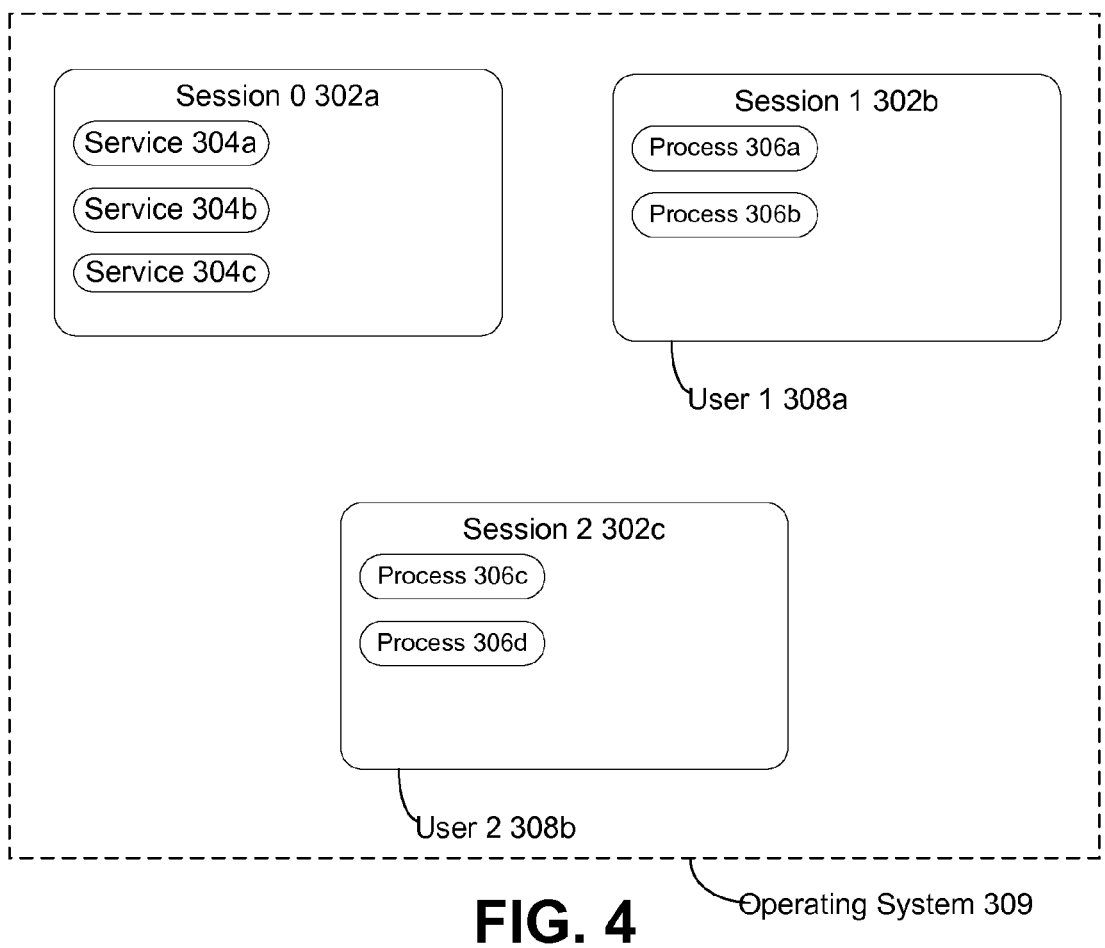
FIG. 4 depicts two user sessions executing on a computer wherein services execute within a session separate from user processes.

FIG. 4 depicts two user sessions executing on an operating system 309 of a computer (such as computer 20) wherein services execute within a session separate from user processes. As depicted in FIG. 4, services are isolated from user processes. Services 304a-c execute within session 0 302a, which is not associated with a user session. When user 1 308a logs in, user 1 308a is assigned to session 1 302b, and user 1 308a's processes 306a-b execute within session 1 302b. Likewise, when user 2 308b later logs in, user 2 308b is assigned to session 2 302c, and user 2 308b's processes 306c-d execute within session 2 302c. In this manner, services 304a-c are isolated from user processes 306a-d, because no service 304 executes within the same session 302 as a user process 306.

Figure 5:
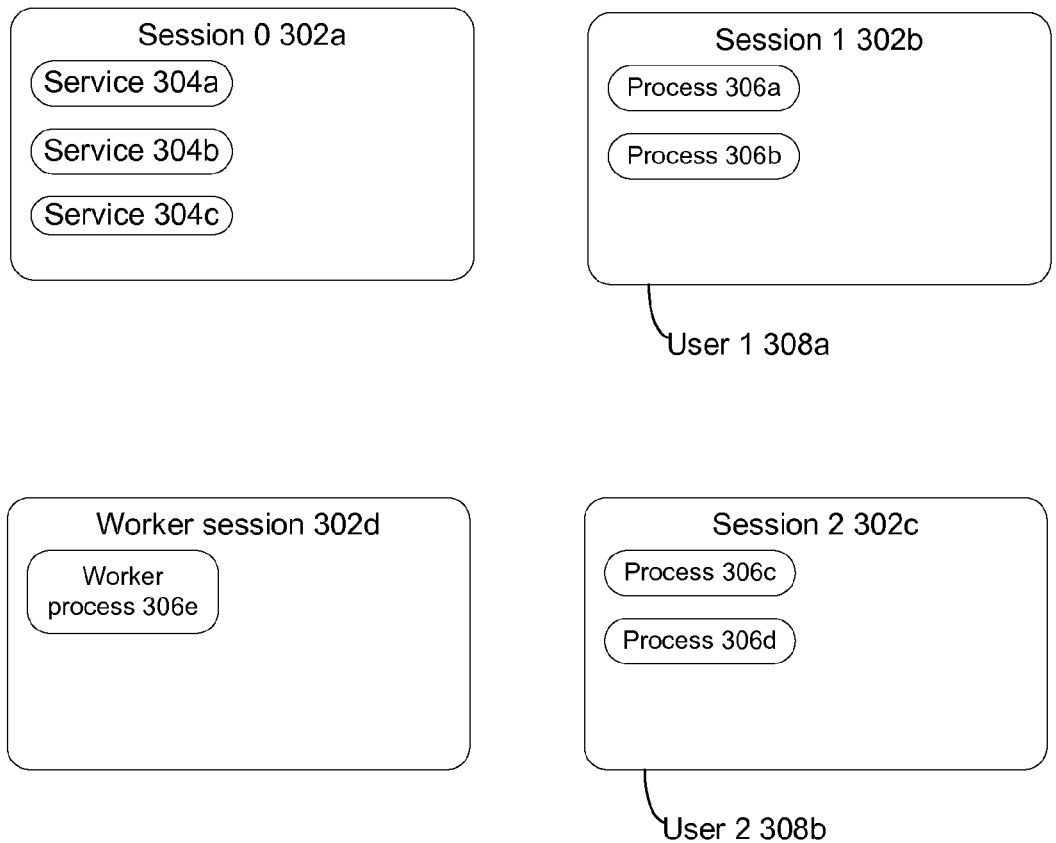
FIG. 5 depicts the two user sessions of FIG. 4 wherein a worker session also executes on the computer to enable isolated services to access a GPU.

FIG. 5 depicts the two user sessions of FIG. 4 wherein a worker session 302d also executes on the computer to enable isolated services to access a GPU. The isolation of services 304 as depicted in FIG. 4 may extend beyond isolation of services 304 from user processes 306. It may also include isolation of services 304 from accessing some system resources, such as the ability to make calls to a GPU. A special session, referred to as a worker session 302d, is created that is configured to host processes (herein referred to as worker processes), such as worker process 306e. Worker process 306e may have access to system resources that isolated services 304 can not access. However, a service in session 0 302a may have the ability to communicate with a worker process.

Thus, a service 304 in session 0 302a may access a system resource that it is otherwise isolated from by communicating with a worker process in worker session 302d (worker session 302d not being isolated in that it can access system resources that session 0 cannot access). The worker process then accesses the system resource on behalf of the service 304, and communicates the result of accessing the system resource back to the service 304.

Worker session 302d may be created upon the system booting up, when service 304d is started. Worker session 302d may be disconnected shortly after user logon is complete. In normal operation, once worker session 302d is disconnected, it may remain disconnected until system shutdown is initiated, unless its shell or a system process running in that session (e.g. in WINDOWS 7 this is referred to as Client/Server Runtime Subsystem—csrss.exe, or winlogon.exe) terminates abnormally or is terminated accidentally, such as through the use of administrator tools. If service 304 (which creates the worker session 302d) stops or terminates abnormally, worker session 302d and processes in that session keep running. As a consequence, when service 304 is restarted (after termination or intentional stop), service 304 is informed that a worker session already exists (such as by providing service 304 with an identifier of worker session 302d) if service 304 attempts to create a worker session.

Worker session 302d is created in response to a remote connection request for a dedicated local user account. Unlike typical user accounts, the user account for the worker session 302d does not represent a user. Rather, it is an account that is created and used by a worker session provider (such as worker session provider 704 of FIG. 7) to log a user on to the worker session 302d automatically. Worker session 302d may be non-interactive while it exists.

Worker session 302d may contain general system processes (e.g. WINDOWS's csrss.exe, winlogon.exe and logonui.exe) and may contain some other processes that are started by logon scripts. The shell running in this session may be explorer.exe, similar to the regular remote desktops. Apart from these processes, worker session 302d may processes created by service 304d after the session is up and running (and disconnected). The termination or abnormal behavior of processes created by service 304d need not affect the functionality or state of the worker session 302d in any way.

According to an aspect of the invention [or Preferably], only the worker user account and system have permissions to operate on worker session 302d. Consequently, worker session 302d does not show up in the list of sessions displayed by administrator tools. Worker session 302d is not reported in a call to an API (application programming interface) that enumerates sessions on the system, unless the process making the API call is running at system level. In an embodiment, worker session 302d can not be reconnected to, shadowed, or logged off, unless the process attempting to do so is running at a system level. However, worker session 302d and the user account name may be visible when processes are enumerated.

In an embodiment, worker session 302*d* is always running Terminating worker session 302*d* will cause the termination of any processes executing within the session, such as a worker process. In turn, termination of a worker process will likely negatively affect a user's experience. The user's experience will likely be negatively affected because the user's processes cannot utilize services that use the worker process while the worker process is terminated.

To enable worker session 302*d* to be always running, worker session 302*d* may be a non-interactive session, so that it is not accidentally logged off. Furthermore, the permissions of worker session 302*d* may be set to prevent an administrator account from using administrative tools to query and logoff worker session 302*d*.

In some operating systems, there is a limit to the number of simultaneous active remote sessions that run on a computer for administrative mode. In some versions of the MICROSOFT WINDOWS® operating system, this limit is two. However, there may be multiple disconnected sessions in addition to these two active sessions. By disconnecting the worker session 302*d*, worker session 302*d* does not consume one of these two active sessions, allowing two other active sessions on the computer.

To enable this disconnected worker session, an entity that creates the worker session 302*d* (such as worker session provider 704 of FIG. 7) may launch a remote presentation session connection to the local host (a loopback connection) while running in session 0. Since the connection is launched in session 0, which is not an interactive session, and since the user logging on to the worker session 302*d* is not a real user, the remote presentation session connection launch may be performed silently—without any user interaction.

If there are already two administrators active when the worker session 302*d* is created (and there is a limit of two active administrators), worker session 302*d* may run into session contention (a disconnect request). Session contention will result in a warning in the (temporary) worker session 302*d* that other users are logged on and gives it a option to send a disconnect request. However, the warning requires user intervention to resolve this contention, and since there is no real user to attend to this message, the connection will finally terminate without success.

The worker session 302*d* is active for a very brief amount of time before it is disconnected. However, if another administrator connects remotely while worker user logon is in progress (a period of time measured in seconds), the administrator may be warmed that there are other users logged on, one of these users being the worker user, which may be confusing to the administrator.

The creation of worker session 302*d* may be relatively transparent, so administrators should not get confused to see a strange user name in the session contention dialog. In order to avoid session contention scenario and facilitate smooth remote logon without interfering with session arbitration, the worker session provider (such as worker session provider 706 of FIG. 7) may: (1) disconnect existing remote connections in order to create a free administrator session that it can use for worker session 302*d* logon; and (2) prevent new remote connections until the worker session 302*d* creation is complete.

There are other ways to avoid session arbitration. For instance, the session arbitration interference (and hence the impact on existing connections) may be avoided if worker session 302*d* is created using a separate license pool. This separate license pool may be implemented by introducing a new license type for worker session 302*d* and keeping the session limit to 1 (such that this separate license pool may be used for the loopback connection, and the other license pool may be used for the "non-loopback" connections).

However, this approach may provide an administrator an ability to create a separate listener himself, and have an active regular desktop session in addition to two active sessions supported. This ability of the administrator to create a separate listener may be avoided by having Remote Connection Manager (RCM) monitoring the state of this session to ensure that it remains disconnected.

Worker session 302*d* comprises a display driver, such as a framebuffer display driver like tsddd.dll. This display driver is registered. Worker session 302*d* may be associated with a worker display driver. Local session manager 706 may pass this information to a Client/Server Run-Time Subsystem (CSRSS; in some MICROSOFT WINDOWS® operating systems, this comprises the user-mode portion of the Win32 subsystem, and is responsible for console windows, creating and/or deleting threads, and implementing some portions of the 16-bit virtual MS-DOS environment), so that win32k loads a worker display driver in worker session 302*d*. The worker session 302*d* may always remain active. It may be reported as "remote session" to other components. However, the worker terminal may not have a stack of drivers associated with it.

Figure 6:
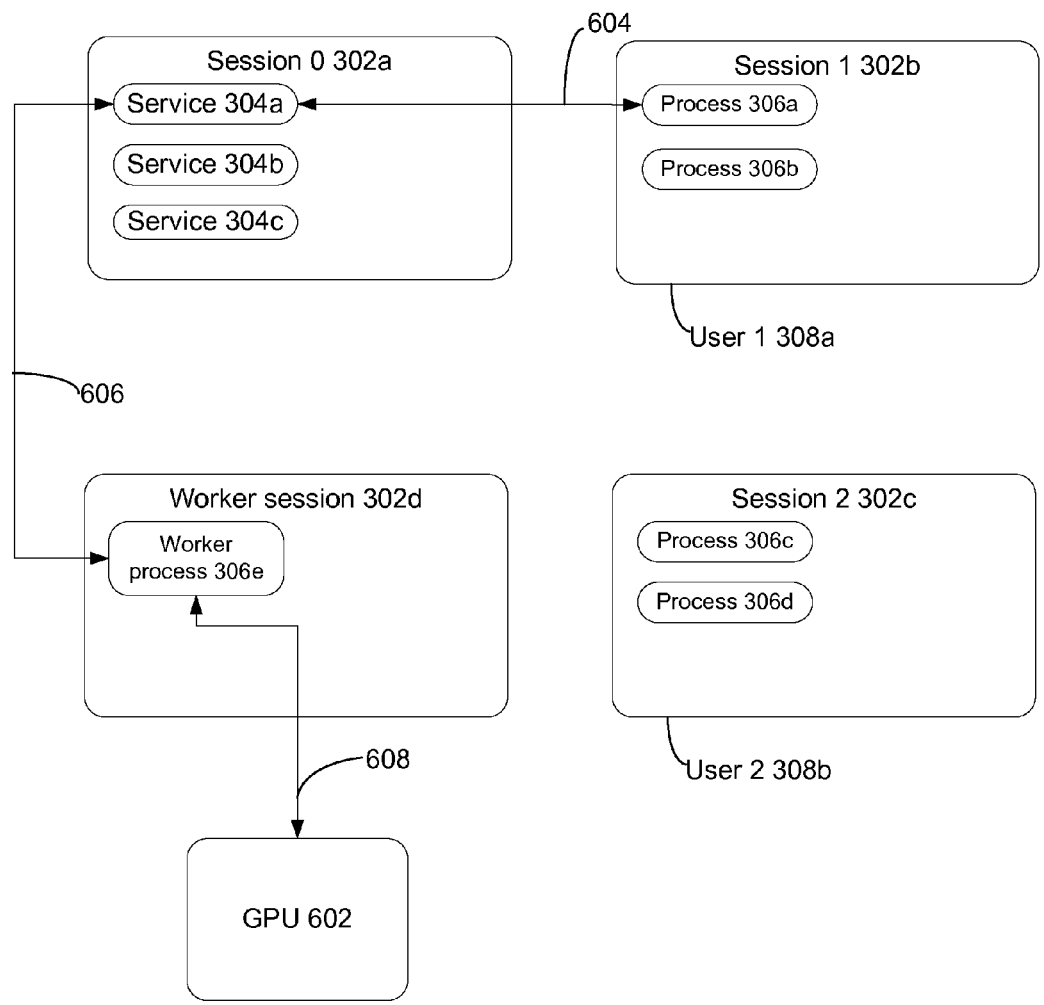
FIG. 6 depicts the user sessions of FIG. 5, wherein a user process accesses a service to make a call to a GPU, and the service in turn, uses a worker process to make the call to the GPU.

FIG. 6 depicts the user sessions of FIG. 5, wherein a user process accesses a service to make a call to a GPU, and the service in turn, uses a worker process to make the call to the GPU. In response to user 1 308*a* logging in, session 1 302*b* is created. User 1 308*a* then executes a process 306*a* within session 1 302*b* that accesses a service 304. For instance, user 1 308*a* could be logged in via a remote presentation session, where process 306*a* is a remote presentation session server process that transmits and receives remote presentation session data from a user client. Process 306*a* may utilize a remote presentation session service 304*a* to compress remote presentation session data that is sent to the user client (such as to compress image data). To compress this data efficiently, remote presentation session service 304*a* may attempt to access a system resource, such as GPU 602. However, because service 304*a* is isolated, it cannot directly access GPU 602.

To overcome this inability to access GPU 602, the following occurs. Process 306*a* communicates 604 with service 304*a* to perform a function for process 306*a*, the function involving access of a system resource 602. Service 304*a* cannot access GPU 602 directly, so service 304*a* communicates 606 with worker process 306*e* so that worker process 306*e* will perform at least the portion of the function that requires GPU 602 access on behalf of service 304*a*. Worker process 306*e* communicates 608 with GPU 602 to perform that portion of the function that requires GPU 602. Upon receiving the result from GPU 602 (such, as where an image is compressed by GPU 602, that compressed image), worker process 306*e* communicates 606 the result to service 304*a*, which communicates it to process 306*a*.

In this described remote presentation session scenario, process 306*a* may then take this result of a compressed image and send it to the user client via the remote presentation session connection.

Figure 7:
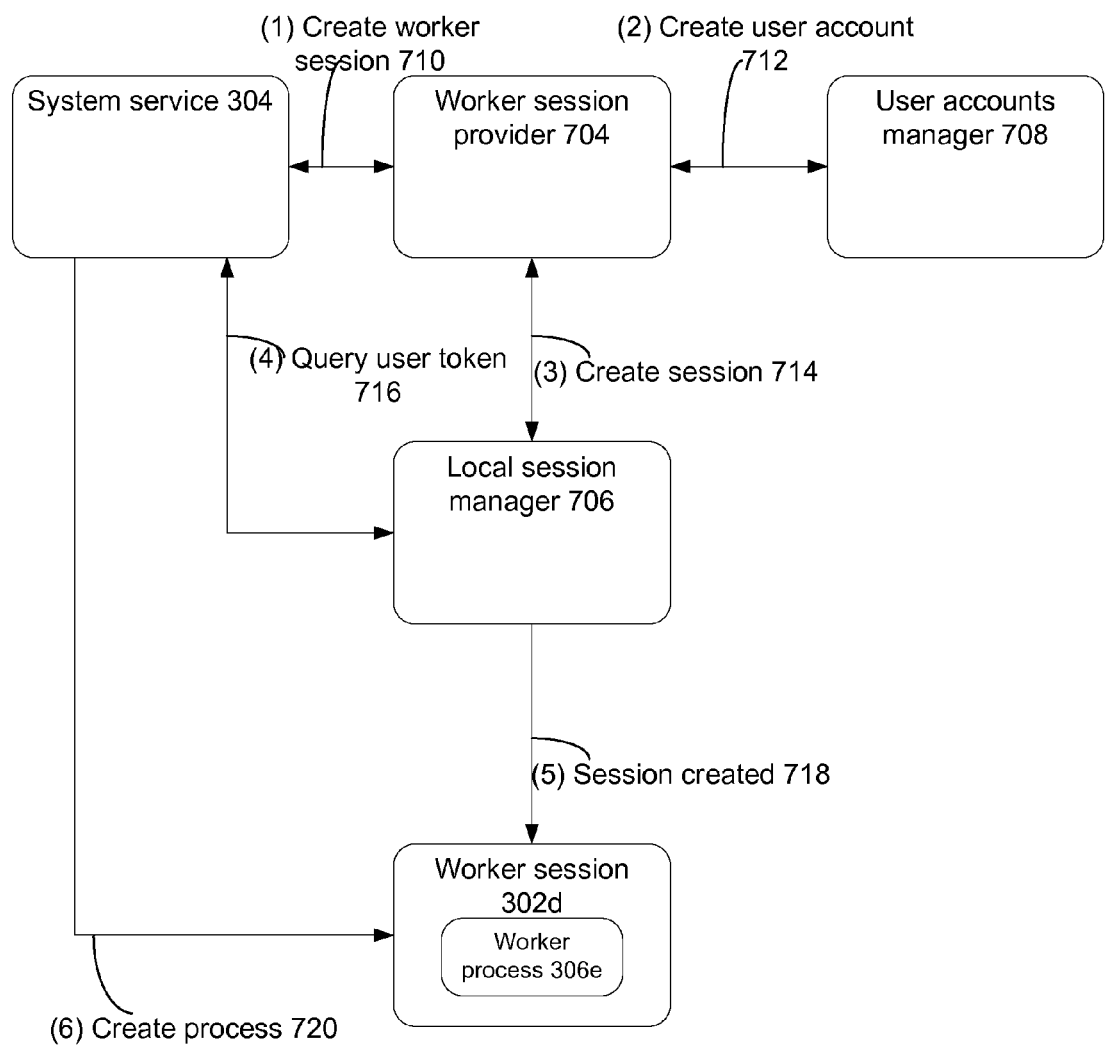
FIG. 7 depicts an example process flow for creating a worker session and worker process, as depicted in FIGS. 4-5.

FIG. 7 depicts communications between components of a system for creating a worker session 302*d* and worker process, as depicted in FIGS. 4-5. The communications may take place, for instance, as a result of system service 304 receiving an instruction to perform a function that involves use of a system resource (like GPU 602) that system service 304 cannot directly access. System service 304 communicates 710 with worker session provider 704 to create a worker session 302*d*. Worker session provider 704 retrieves 712 from user accounts manager 708 an identification (such as a SID) of the worker user account that is associated with a worker session 302*d* (herein depicted as worker session 302*d*). If a worker user account does not exist, worker session provider 704 instructs 712 user accounts manager 708 to create a worker user account, and worker session provider receives an identification of this newly created worker user account. Having an identification of the worker user account, worker session provider 704 determines 714 from local session manager 706 whether a session associated with this worker user account (which would be the worker session 302*d*) already exists.

The following operations may be performed by worker session provider in creating a worker session and worker process: (1) Check a local security authority (LSA) store to see if the SID for the worker user account exists. If the account does not exist, create a local user account with a known name (one that other components will be aware of before creation of the account); (2) Create a random password and set it for the worker user account. This may be done regardless of whether user account existed before or not. Enable the worker user account, if it was disabled before; and (3) Look up the user account to get the SID and save it in LSA store if the user account is newly created. Return the SID to the caller.

In addition, on every request for creating worker session 302*d*, the worker session provider (such as worker session provider 704 of FIG. 7) may reset the password for the worker user account. The password may be reset to a new value such as by performing the following: (1) Create a Crypto provider to generate a random number. This password creation can be effected through the WINDOWS® API CryptAcquireContext; (2) Use five character arrays—one array contains all numerical digits, second array contains all special characters (e.g. @, #, $ etc), third array contains all uppercase characters, fourth array contains all lower-case characters and fifth array includes all the above characters. These character arrays are used to ensure that the password contains all the special characters to satisfy the password policy. (3) Generate random numbers. The API CryptGetRandom is used for this purpose. Use these random numbers to shuffle the fifth character array and then in loop to fill up the password (for a given size) using fifth array; and (4) Shuffle the rest of the four arrays using more random numbers, and shuffle the position numbers (character indices) within the password and set those values using the rest of the four arrays.

Worker user credentials may be cached. This function uses credential manager to cache worker user credentials. Caching user credentials is one of the steps required to facilitate silent logon without user intervention. This function may be invoked by a coordinator thread when it is ready to launch remote connection. This function uses CredWrite API to cache the credentials. It saves the credentials as generic credentials (CRED_TYPE_GENERIC) and they persist only in current session (CRED_PERSIST_SESSION). That means these saved credentials can not be read by any component/application running outside of session 0. The cached credentials are deleted as soon as the worker session 302*d* creation is complete.

The worker session 302*d* may be created for a remote connection request. The worker session 302*d* should remain in a disconnected state (so as not to consume a limited active administrator space on the computer). A disconnected session that was created in response to user logon at a physical console as a disconnected display driver (TSDDD) associated with it. In an embodiment, the worker process needs to use DIRECTX® graphics APIs and some versions of TSDDD do not support DIRECTX® APIs, so attempting to use such APIs will fail in this case. If the session is, however, created for a remote connection request, when connected, it has RDPDD (Remote Display Protocol Device Driver) associated with it, which allows the worker process to use DIRECTX® APIs.

If such a session already exists, local session manager 706 provides 716 to system service 704 an identifier (session ID) for the session. If such a session does not exist, local session manager 706 creates 718 worker session 302*d*. In doing so, local session manager 706 may also reset the worker user account's password to a random string of characters (to make it difficult for a party to log on to this session, which is designed to not be logged on to) and enables the worker user account.

Where TermService is not already started, TermService is started. This may be done where some RPC APIs are implemented in RCM to facilitate user logon.

Local session manager 706 then binds TermService to a local session manager RPC (remote procedure call) endpoint and calls its RPC API to create worker session 302*d* with an encrypted password. After worker session 302*d* is created, its password is reset, the worker user account is disabled (so it cannot be used to logon to worker session 302*d*), TermService's state is restored, and an identifier of worker session 302*d* is sent 716 to system service 304.

Having the identifier of worker session 302*d*, system service 304 may now create 720 a worker process 306*e* within worker session 302*d*. System service 304 may then use worker process 306*e* to gain access to a system resource that system service 304 does not directly have access to.

Local session manager 706 may tell other system components that the worker terminal is "remote," when it is not remote. This is because, if the terminal is not remote, other system components (e.g. LogonUI) will not ask RDS components for user credentials and the session will eventually go away.

Although the worker session provider component is shown in a separate box in the above diagram for convenience, it may be statically linked in service 304. The coordinator component is a main thread that binds the functions of all the various components in the worker session provider.

Figure 8:
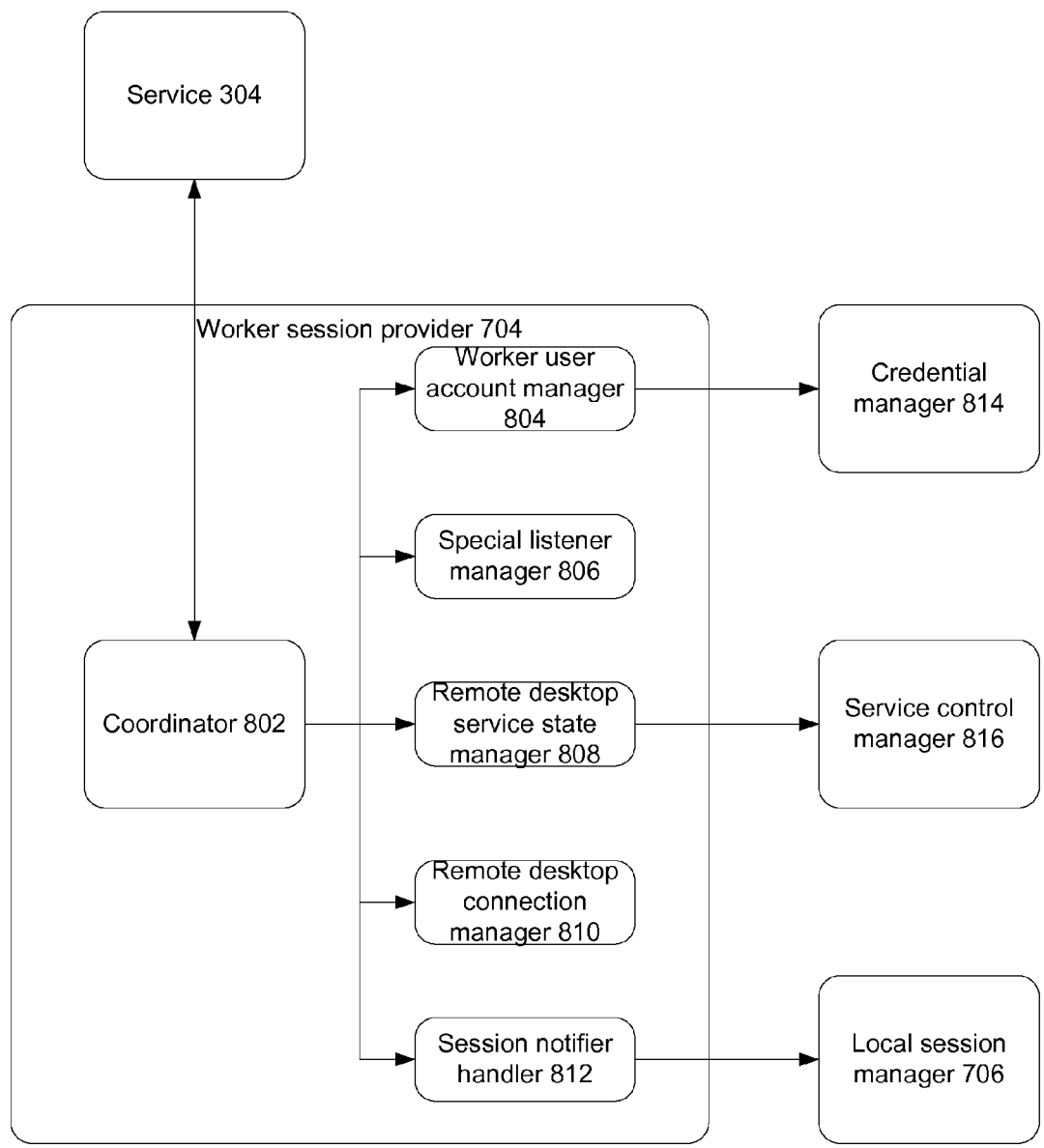
FIG. 8 depicts an embodiment of the worker session provider of FIG. 7.

FIG. 8 depicts an embodiment of the worker session provider of FIG. 7. [So? Why should I care?]

Worker user account manager 804 creates and manages a dedicated worker user account for logon to worker session 302*d*. Worker user account manager performs functions including: (1) finding out if the worker user account is created or not. If it is not created, worker user account manager creates a user account. If an account has already been created, worker user account manager enables that user account; (2) resetting worker user account's password on each create worker session 302*d* request; (3) allowing the worker user access to the special listener and administrator connections. Worker user account manager removes this access after the worker session 302*d* creation is completed; (4) caching worker user credentials using credential manager for remote desktop to local host without user intervention. Removing them when the worker session 302*d* creation is completed; (4) Denying local logon to the worker user account; and (5) hiding the worker user account so that it does not show up in the control panel.

The worker session 302*d* needs to disconnect existing remote users and prevent new remote connections while the worker session 302*d* creation is in progress. This is required to prevent worker session 302*d* from running into session arbitration.

Special listener manager 806 creates a dedicated listener with special permissions, in order to initiate a remote connection for the worker session 302*d*. Special listener manager 806 performs functions including: (1) creating a separate listener, with a distinct port number, for "worker connection;" (2) assigning a security descriptor to the listener so that only the worker user account has logon permissions, and the system has full permissions; and (3) deleting the listener after worker session 302*d* creation is complete.

The special listener manager creates and manages a special listener which can be used by worker session provider to request a remote connection and create a session with special permissions.

The operation to create a listener manager is invoked by the coordinator thread. This function takes the user SID associated with the worker user as input and returns port number if succeeded. It uses the input SID to tight the access permissions for the listener. The port number returned by this method is used by the coordinator thread later to invoke remote connection to correct port.

Remote presentation connection manager 810 configures settings and generates resources to ensure the silent and non-interactive launch of the remote connection for creating worker session 302*d*. Remote presentation connection manager 810 performs functions including: (1) writing configuration settings in order to facilitate the silent remote connections; (2) creating a process on a remote presentation client (such as mstsc.exe) on the disconnected desktop of session 0; and (3) waiting for the shell to start in the worker session 302*d* and then terminating the remote presentation client process.

In initiating a remote presentation connection, first a process is created on a remote presentation client.

For creating a worker session 302*d*, the worker session provider may initiate remote connection. It does so by creating remote desktop client process (such as CreateProcess on mstsc.exe). This process runs in system context on the disconnected desktop of session 0. The worker session provider creates a .RDP file that contains the information required to make the connection and passes that file name as input parameter to the process.

To know whether the connection succeeded or not, the worker session provider may register for session notifications from the local server and wait for a period of time (e.g. one minute) for successful shell start for the worker session 302*d*. If the shell start notification is not received, it assumes that the remote connection failed and it returns error to the caller.

After receiving a shell start notification (or timeout) worker session provider 704 may terminate the remote desktop client process, which results in disconnection of the worker session 302*d*.

If remote desktop server role is installed on the host partition, where worker session 302*d* needs to be created, remote connections consume remote desktop CALs (device or user licenses), except for the administrative connections. It may not be desirable to consume CAL for the worker session 302*d*, so the worker session provider may use an administrative flag (such as /admin) for making a remote connection to local host.

Remote presentation service state manager 808 manages the state of the remote presentation service in order to ensure smooth and silent completion of remote presentation connection for worker session 302*d* without interfering with the session arbitration and existing sessions. Remote presentation service state manager 808 performs functions including: (1) stopping the remote presentation session service to disconnect existing remote users, and disabling existing listeners to prevent new connections for avoiding worker session 302*d* creation from running into session arbitration handling; (2) saving states of the remote presentation service, connection handlers and listeners before creating worker session 302*d* and restoring states after worker session 302*d* creation is complete; and (3) synchronizing the service 304 with the other entities that may also start the remote presentation service, since the service 304 and remote presentation service may start at almost the same time during boot.

Worker session provider may verify that the worker session 302*d* is not running prior to creating one. Also, after the worker session 302*d* is created, it may verify that the user logon is complete before disconnecting the worker session 302*d*. Session notification handler 812 waits for dedicated user logon to complete on the worker session 302*d* after the worker session 302*d* is completed. It also helps in ensuring that there are no other remote connection requests in progress when the remote connection for worker session 302*d* is initiated. It also helps with enumerating existing sessions and finding out whether the worker session 302*d* already exists.

The following functions may occur to prepare for a silent remote presentation connection. First, worker user credentials may be stored to a credential manager (such as WINDOWS® Vault) for automatic logon.

For creating a worker session 302*d*, the worker session provider creates or enables the dedicated user account for the remote connection and resets its password. Then it uses credential manager to store the worker user credentials in the vault for termsrv/localhost resource. This enables worker session provider 704 to automatically logon the dedicated user account when a loopback connection (remote connection to localhost) is initiated. This step suppresses the dialog asking for user credentials.

Second, the server authentication warning may be suppressed. When the remote connection is initiated, it attempts to verify the server identity and displays warning if the identity can not be verified. Since worker session provider is attempting a loopback connection, it does not need to worry about verifying the identity and it needs to suppress this warning without user intervention. For that purpose, while preparing the RDP file, it writes "authentication level:i:0" to indicate the remote desktop client not to warn about verification error.

The worker session provider may use a separate listener to initiate a remote connection in order to create a worker session 302*d* for the following reasons: (1) prevent accidental logoff (this may be done by having a special security descriptor on a listener); (2) suppress warning "other users are logged on" during shutdown (this may be done by specifying a separate terminal type and session source for all the connections received on the listener); and (3) over-ride "logoff on disconnect" policy (this may be done by specifying a separate terminal type for all connections received on the listener).

With regard to (1) preventing accidental logoff, the worker session 302*d* is a non-interactive session. And it may need to stay until server shutdown if it is to deliver uninterrupted experience to the end user. In order to achieve that, the logoff of the session (or any such operation on the session) through administrative means may be prevented.

Each session has a security descriptor indicating which users have permissions to perform what operations, e.g. to query information (list the session in the enumerated list), disconnect, logoff, send message etc, on that session. Whenever the LSM is requested to perform an operation on any session (through RPC call), it impersonates the caller and checks against session's security descriptor if the caller has permission to perform that operation.

The session with the remote connection inherits the security descriptor from the listener, where the connection was initiated. So, if the worker session 302d was created for a remote connection received on the default listener, administrators can see that session in the admininstator tools and may intentionally or accidentally logoff that session. In order to prevent logoff (or any such operation) on worker session 302d, the remote connection should be requested on a listener which has a special security descriptor that allows only the worker user and the local system to perform operations on the resulting session. The worker session provider 704 creates this listener with a special security descriptor prior to requesting the worker session 302d connection. Worker session provider 704 may delete the listener after worker session 302d is created.

With regard to (2) suppressing a warning "other users are logged on" during shutdown, when the administrator initiates the shutdown, if there are other users logged on, those users may receive a warning message stating that "other users are logged on." With worker session 302d running and worker user logged on to it, an administrator will see this warning. However, if administrator uses administrator tools, there will not be any sessions reported and this will result in confusion about why the warning message is shown.

The reason for the discrepancy in the user session not being reported to the administrator tool, but being reported during shutdown is because of the check on permissions on a specific session. When an administrator uses administrator tools, the permission on the session may not allow a query, so the worker session 302d is not reported. However, the warning message during shutdown is shown by the user32.d11 component, which actually asks remote desktop about total number of users logged on to the session. This query does not include "query" permission on a particular session. So, worker session 302d is counted towards "other user sessions" currently logged on.

With regard to (3) overriding the logoff on disconnect policy, if an administrator has set the group policy for session timeout limit, this will impact the life-time of worker session 302d. For example, if the policy says "logoff session if disconnected for x minutes", the worker session 302d will be logged off after x minutes. Although this logoff is initiated by RCM running at network service privilege, this logoff may not be initiated through a RPC call, where permissions checks are made. However, it invokes logoff method of session object directly, which will successfully logoff the worker session 302d.

A special terminal type helps with these issues. The Remote Connection Manager (RCM) has an infrastructure to define the "type" of the remote terminal. The examples of the terminal types are regular desktop, Remote App, MCE, etc. The RCM has a (limited) ability to over-ride session specific policies on the sessions with different terminals. For example, the "initial program" policy is over-ridden for remote app terminal type. The worker session provider could choose a special terminal type for the worker session 302d, for which the session timeouts are not applied. However, this requires changes in the RCM.

Each terminal type can define a "source" of the session—a value that indicates who initiated the remote connection. The two known values for the source are user (e.g. for regular desktop terminals) and device (e.g. for MCE terminals). The worker session provider can use a special value here (e.g. source=service), because the remote connection is actually initiated by a service. When the machine is shutdown, the user32 component queries about the number of regular desktop and devices sessions and either of them is non-zero, it reports the warning. If the worker session 302d source is neither of them, then it will get rid of the warning.

Worker session 302d may have a special terminal type in order to solve the issues with the warning message during shutdown and the session time limit policy over-rides. In order to use the special terminal type, when the worker connection is made, RCM may need to know that this connection is requested for worker session 302d. This special terminal type may be effected, for instance, by having RCM treat all the connections received on the special listener as a special terminal type based on listener registration. A new registry value (e.g. TerminalType) is added to listener registration that tells RCM to assign that terminal type to all the connections received on that listener.

The RCM may have a limited support for over-riding the policies for a different terminal type than regular desktop, but it may not be adequate to over-ride some of the policies for the worker session 302d. A way to over-ride the policies for worker terminal type is to have hard-coded checks for the terminal type and not apply the policies.

Figure 9:
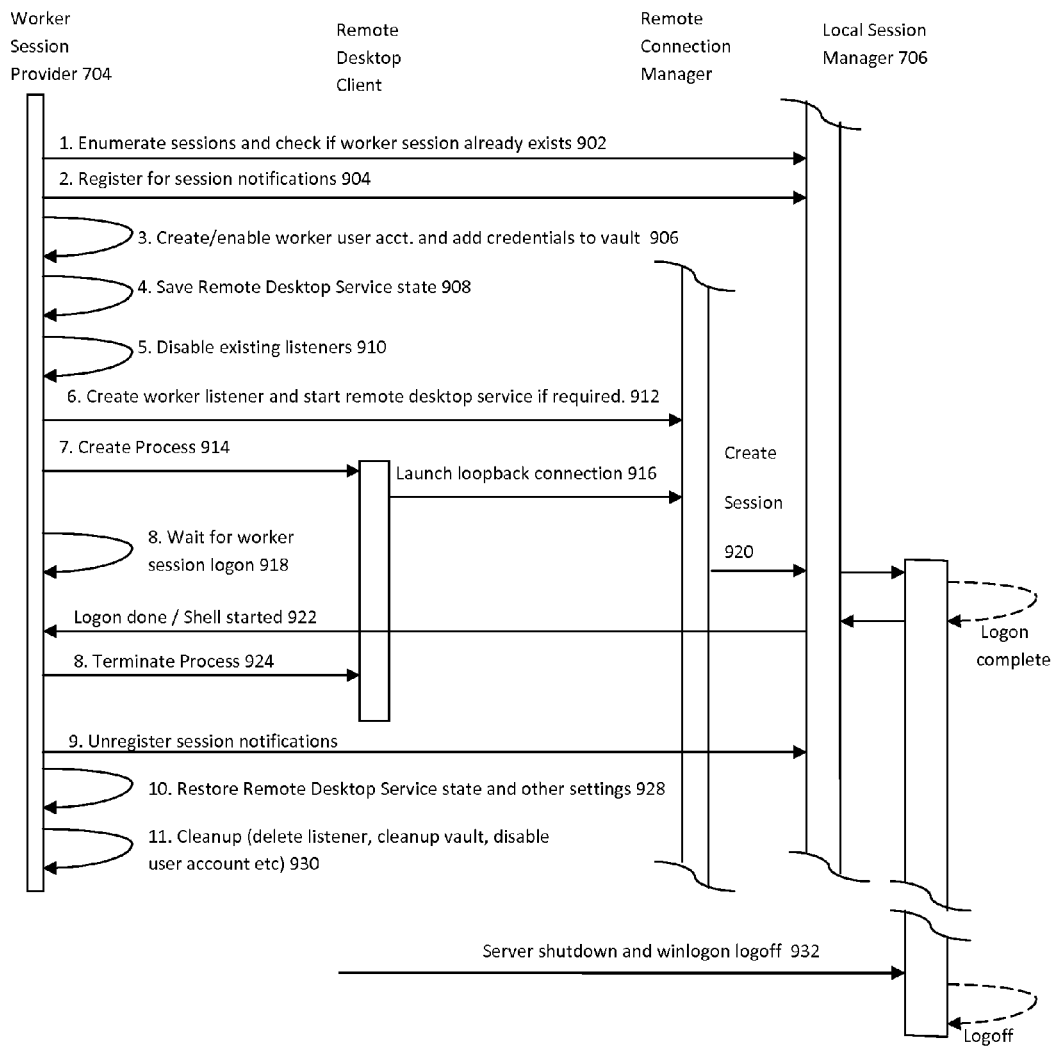
FIG. 9 depicts a sequence of operations that may occur to create the worker session 302d depicted in FIGS. 4-5.

FIG. 9 depicts a sequence of operations that may occur to create the worker session 302d depicted in FIGS. 4-5.

First, worker session provider enumerates sessions from local session manager and checks if a worker session 302d already exists 902. Then, worker session provider registers for session notifications 904 from local session manager. Worker session provider creates and enables a worker user account and adds the worker user account credentials to a vault 906. Worker session provider saves remote presentation service state and other settings 908. Worker session provider disables existing listeners 910. Worker session provider creates worker listener and starts remote presentation service, if required 912. Worker session provider creates a process (mstsc.exe) 914, which launches a loopback connection 914 with remote connection manager, which creates a session 920 with local session manager. Worker session provider waists for worker session 302d logon 918, and eventually local session manager informs worker session provider that logon is complete and a shell was started 922. Worker session provider terminates the process 924. Worker session provider unregisters session notifications 926 from local session manager. Worker session provider restores remote presentation service state and other settings 928. Worker session provider performs cleanup operations 930, including deleting the listener, cleaning up the value, and deleting the user account. The service ends upon computer shutdown and logoff (such as winlogon logoff) 932.

Figure 10:
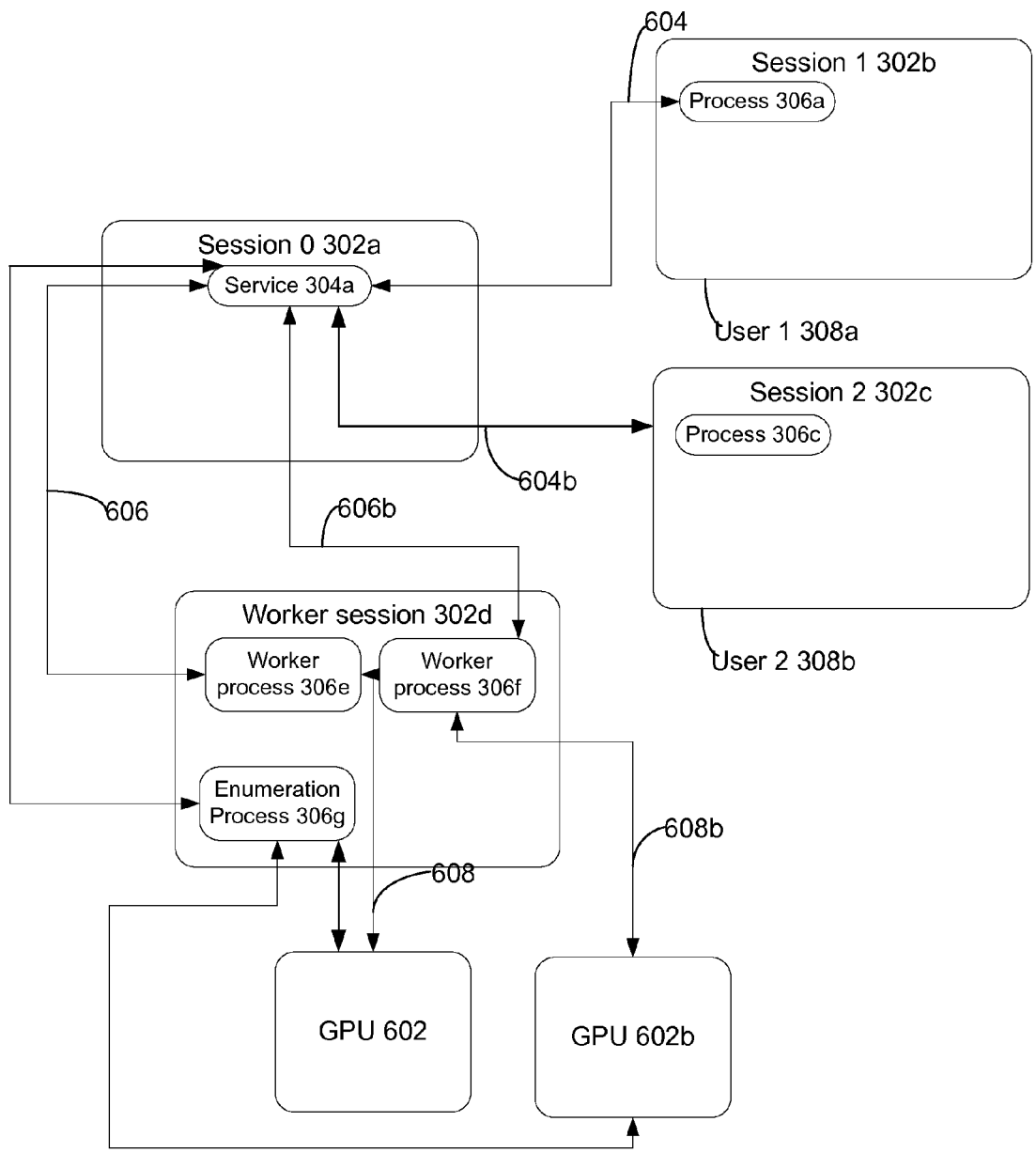
FIG. 10 illustrates a system where two worker sessions are implemented, each worker session having access to a separate GPU.

FIG. 10 illustrates a system where two worker sessions are implemented, each worker session having access to a separate GPU. This system may be implemented in a similar manner as the single-worker session embodiment depicted in FIG. 6, along with the following modifications.

Here, two processes—process 306a of session 1 302b, and process 306c of session 2 302c—access a service—service 304a—to make a call to GPUs. Worker process 306e is instantiated to provide access to a GPU to service 304a to do work on behalf of process 306a, and worker process 306f is instantiated to provide access to a GPU to service 304a to do work on behalf of process 306c.

Similar as to described in FIG. 6, process 306a communicates 604 with service 304a to perform a function for process 306a, the function involving access of a system resource 602. Service 304a cannot access GPU 602 directly, so service 304a communicates 606 with worker process 306e so that worker process 306e will perform at least the portion of the function that requires GPU 602 access on behalf of service 304a. Worker process 306e communicates 608 with GPU 602 to perform that portion of the function that requires GPU 602. Upon receiving the result from GPU 602 (such, as where an image is compressed by GPU 602, that compressed image), worker process 306e communicates 606 the result to service 304a, which communicates it to process 306a.

Likewise, process 306c communicates 604b with service 304a to perform a function for process 306c, the function involving access of a system resource 602b. Service 304a cannot access GPU 602b directly, so service 304a communicates 606b with worker process 306f so that worker process 306f will perform at least the portion of the function that requires GPU 602b access on behalf of service 304a. Worker process 306f communicates 608b with GPU 602b to perform that portion of the function that requires GPU 602b. Upon receiving the result from GPU 602b (such, as where an image is compressed by GPU 602b, that compressed image), worker process 306f communicates 606b the result to service 304a, which communicates it to process 306f.

It may be appreciated that, in an embodiment, the image encoding on behalf of both processes 306a and 306c could be performed on a single GPU, or that there are various ways to distribute the loads using an arbitrary number of processes executing in user sessions that attempt to encode images using service 304a and an arbitrary number of GPUs. For instance, a static load balancing algorithm may be used, where a new process is assigned to the GPU with the least number of such processes using that GPU. Where all GPUs have the same number of processes, the new process may be assigned to the GPU with the lowest VRAM usage. Where all GPUs have the same amount of VRAM usage, the process may be assigned to the first GPU in an enumeration of the GPUs.

Service 304a may allocate processes among GPUs by determining characteristics of the GPUs, such as their number and their respective available load. Service 304a may determine the identity of GPU 602 and 602b by instantiating a process (enumeration process 306g) within worker session 302d. Enumeration process 306g may be configured to communicate with GPU 602 and 602b to determine the number of GPUs available, as well as other pertinent information, such as their respective load, or VRAM usage. Enumeration process 306g may return such information to service 304a upon being queried for it, and service 304a may use this information to determine which GPU a process in a user session (such as processes 306a and 306c) will be associated with (such that that GPU does work on that process' behalf).

In an embodiment, this system depicted by FIG. 10 may comprise a remote presentation session server that hosts multiple remote presentation sessions, and uses the system's GPUs to perform some steps of hosting those remote presentation sessions. For instance, process 306a and process 306c may be instances of a remote presentation session process that respectively conduct a remote presentation session with a separate client. In the course of conducting those remote presentation sessions, process 306a and process 306c may attempt to compress an image or frame to send to a client, and use service 304a to do so. Service 304a may attempt to leverage the use of the GPUs of the system to perform this compression. Further, to balance the load of this compression, service 304a may communicate with two processes—worker processes 306e and 306f, which in turn are able to communicate with separate GPUs—GPUs 602 and 602b, respectively.

Conclusion

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for enabling a service executing in an isolated session on a system to access a system resource from which the service is isolated, comprising:
    instantiating a worker session by an operating system operating on the system, the worker session being a separate session from the isolated session and the worker session being a separate session from any user session executing on the system, instantiating the worker session including creating the worker session by a service executing in the isolated session by establishing a loopback remote presentation session connection to the system;
    instantiating a worker process, the worker process executing in the worker session, the worker process having access to the system resource;
    receiving by the service, a first communication indicative of a request from a first process to access the system resource;
    sending, by the service, a second communication indicative of a request to the worker process to access the system resource;
    in response to receiving, by the worker process, the second communication, accessing the system resource to produce a first result; and
    transmitting, by the worker process, the first result to the service.

2. The method of claim 1, wherein sending, by the service, the request to the worker process to access the system resource in performed in response to:
    receiving, by the service, an indication of the request from a user process executing in a user session; and further comprising:
    transmitting, by the service, the first result to the user process.

3. The method of claim 2, wherein the user process executes within a virtual
    machine, the user process comprises a remote presentation session server process in communication with a client computer via a remote presentation session connection, and the request to the worker process comprises a request to compress an image to be sent via the remote presentation session connection.

4. The method of claim 1, wherein creating the worker session includes:
creating the worker session to be non-interactive.

5. The method of claim 1, wherein creating the worker session includes:
setting permissions of the worker session such that an administrator lacks permissions to logoff the worker session.

6. The method of claim 1, wherein a plurality of system resources comprises the system resource and a second system resource, further comprising:
determining that a second process has been instantiated, the second process configured to request access to a system resource of the plurality of system resources;
determining to process requests from the second process to access a system resource of the plurality of system resources with the second system resource, based on an availability of the plurality of system resources;
instantiating a second worker process, the second worker process executing in the worker session, the second worker process having access to the second system resource;
receiving by the service, a third communication indicative of a request from the second process to access the second system resource;
sending, by the service, a fourth communication indicative of a request to the worker process to access the system resource;
in response to receiving, by the worker process, the second communication, accessing the system resource to produce a second result; and
transmitting, by the worker process, the second result to the service.

7. The method of claim 6, wherein the system resource comprises a first graphics processing unit (GPU) and the second system resource comprises a second graphics processing unit (GPU).

8. The method of claim 1, wherein establishing the loopback remote presentation session connection to the system includes:
creating a listener on a distinct port for the loopback remote presentation session connection; and
deleting the listener upon creating the worker session.

9. The method of claim 1, wherein a remote presentation session connection requires a license, further comprising:
assigning the loopback remote presentation session connection a license from a license pool separate from a second license pool of at least one license from which non-loopback remote presentation session connections receive licenses.

10. A system for enabling a service executing in an isolated session on the system to access a system resource from which the service is isolated, comprising:
a processor; and
a memory communicatively coupled to the processor, the memory bearing computer-executable instructions that, upon execution by the processor, cause at least:
creating a worker session, the worker session being a separate session from the isolated session and the worker session being a separate session from any user session executing on the system, creating the worker session including creating the worker session by a service executing in the isolated session by establishing a loopback remote presentation session connection to the system;
creating a worker process, the worker process executing in the worker session, the worker process having access to the system resource;
sending, by the service, a request to the worker process to access the system resource;
in response to receiving, by the worker process, the request to access the system resource, accessing the system resource to produce a result; and
transmitting, by the worker process, the result to the service.

11. The system of claim 10, wherein creating the worker session includes:
determining that a worker user account to be associated with the worker session does not exist;
creating the worker user account;
generating a random password for the worker user account; and
creating the worker session with the worker user account.

12. The system of claim 11, wherein the memory further bears computer- executable instructions, that when executed on the processor, cause the processor to perform operations comprising:
generating a second password for the worker user account in response to creating the worker session with the worker user account.

13. The system of claim 10, wherein creating the worker session includes:
registering, by a worker session provider, for session notifications;
creating, by the worker session provider, a remote presentation session process, the remote presentation session process creating a loopback remote presentation session with the system; and
upon determining that the worker session has logged onto the system, unregistering, by the worker session provider, from session notifications.

14. The system of claim 10, wherein the memory further bears computer- executable instructions, that when executed on the processor, cause the processor to perform operations comprising:
suppressing a warning that other users are logged on during administrator-initiated shutdown, when there are no sessions executing on the system but the isolated session, the worker session, and a session associated with an administrator.

15. The system of claim 10, wherein the system resource comprises a graphics processing unit (GPU).

16. The system of claim 10, wherein creating the worker session includes:
setting the worker session to a disconnected state.

17. The system of claim 10, wherein no user processes execute within the isolated session.

18. The system of claim 10, wherein creating the worker session includes:
creating the worker session in response to determining that no other worker session exists.

19. A computer-readable memory bearing computer-executable instructions for enabling a service executing in an isolated session on a system to access a system resource from which the service is isolated, that when executed on a computer, cause the computer to perform operations comprising:
creating a worker session, the worker session being a separate session from the isolated session and the worker session being a separate session from any user session executing on the computer or another computer, creating the worker session including creating the worker session by a service executing in the isolated session by establishing a loopback remote presentation session connection to the system;

creating a worker process, the worker process executing in the worker session, the worker process having access to a system resource;

sending, by the service, a request to the worker process to access the system resource;

in response to receiving, by the worker process, the request to access the system resource, accessing the system resource to produce a result; and transmitting, by the worker process, the result to the service.

\* \* \* \* \*